(No Model.)

W. N. COLAM.
CABLE TRAMWAY.

No. 395,425. Patented Jan. 1, 1889.

WITNESSES:
Edward C. Hammond.
Arthur M. Flack.

INVENTOR:
William Newby Colam.
By his Attorney.
Robt. Ed. Phillips.

UNITED STATES PATENT OFFICE.

WILLIAM NEWBY COLAM, OF LONDON, COUNTY OF MIDDLESEX, ENGLAND.

CABLE TRAMWAY.

SPECIFICATION forming part of Letters Patent No. 395,425, dated January 1, 1889.

Application filed February 29, 1888. Serial No. 265,755. (No model.)

*To all whom it may concern:*

Be it known that I, WILLIAM NEWBY COLAM, a subject of the Queen of Great Britain, residing at London, in the county of Middlesex, England, have invented certain new and useful Improvements in Cable Tramways, of which the following is a specification.

My invention relates to an improvement in cable tramways, the object being to prevent damage to the gripper-shank or car in case a driver allows his car to overrun its proper stopping-place at a terminal station.

With this end in view my invention consists, first, of a stop or buffer mounted between the slot-rails and adapted to cushion longitudinally, and, secondly, of certain details of construction and combination of parts, as will be hereinafter described, and pointed out in the claims.

Figure 1:
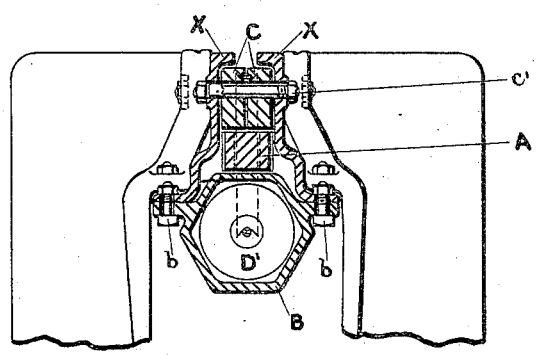
Figure 2:
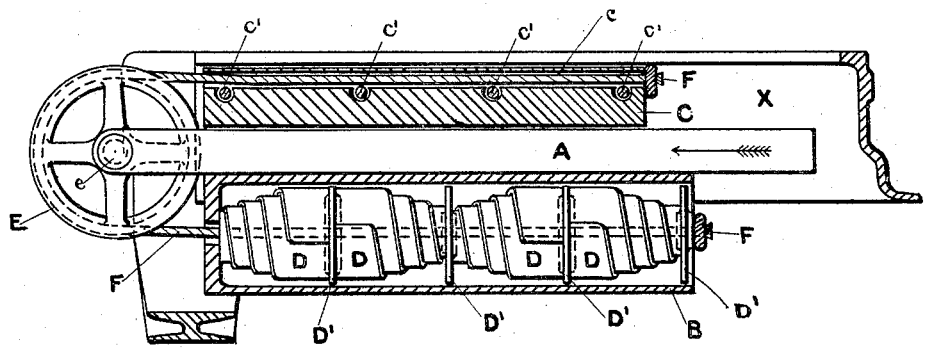

In the accompanying drawings, Figure 1 is a view of the slot-rails and part of the cable-way in cross-section embodying my invention, and Fig. 2 is a view thereof in sectional side elevation.

Throughout the views similar parts are marked with like letters of reference.

The stop or buffer consists of a bar or piston, A, sliding freely in a channel formed between the inner sides of the slot-rails X X, the top of a longitudinal box, B, bolted to the under sides of the slot-rails by bolts *b b*, &c., and the under side of a pair of packing-pieces, C C, as shown. In the box B, which is closed at its forward end, but open at its rear end, are arranged a series of four or more volute springs, D D, &c., preferably arranged in pairs, with plates D' D', &c., between them, as shown. The forward end of the rod or piston A is forked to adapt it to receive a small pulley, E, mounted loosely on pin *e*, fixed in the prongs of the said fork. Through the springs D D, &c., is passed a length of wire rope or chain, F, which is fixed or connected to the plate D', bearing against the outer end of the spring at the rear end of the box B. This rope or chain, after passing through the springs, passes out through a hole in the closed end of the box B, thence round the pulley E, after which it is fixed to the slot-rails by being passed through a recess, *c*, formed by and between the packing-pieces C C, which are fixed to the slot-rails X X by the bolts *c' c'*, &c.

The rod or piston A is made of such a length that it will always stand proud of the rear end of the box B even under the greatest compression of the springs D D, &c. When the shank of the gripper of a car comes in contact with the rod or piston B through the negligence of the driver or through accident, it cushions longitudinally against the springs D D, &c., through the rope or chain F, and so checks the speed of the car by absorbing its momentum.

It will be obvious that the fixed end of the rope or chain F may be made fast to any other convenient part of the track or framework of the cable-way, and I would have it generally understood that I do not limit myself to the exact construction and arrangement of the several parts hereinbefore described and shown, but hold myself at liberty to make such changes and alterations as fairly fall within the spirit and scope of my invention.

I do not claim the slot-rail in this application, as the same is described and claimed in a separate application, Serial No. 265,754, filed February 29, 1888.

Having fully described my invention, what I claim as new, and desire to secure by Letters Patent, is—

1. In a cable tramway, the combination, with the slot-rails and cable-way, of the longitudinal box fixed to the said slot-rails and containing volute springs adapted to cushion longitudinally, as set forth.

2. In a cable tramway, the combination, with the slot-rails and the cable-way, of the longitudinal box containing four or more volute springs arranged in pairs with plates between them and adapted to cushion longitudinally, as set forth.

3. In a cable tramway, the combination, with the slot-rails and the cable-way, of the bar or piston sliding freely in a channel formed by and between the inner sides of the slot-rails, the top of the longitudinal box, and the inner side of packing-pieces fixed between the said rails, as set forth.

4. In a cable tramway, the combination, with the slot-rails, of the longitudinal box containing volute or analogous springs adapted to cushion longitudinally, and the bar or piston forked at its forward end to carry a small pulley and adapted to slide longitudinally in a channel formed between the slot-rails, as set forth.

5. In a cable tramway, the combination, with the slot-rails, of the bar or piston sliding freely in a horizontal plane between the slot-rails and carrying a pulley, partially round which passes a length of wire rope or chain fixed at one end to the slot-rails and passing through the volute springs in the longitudinal box and fixed to a plate bearing against the rear spring, as and for the purpose set forth.

6. In a cable tramway, the combination, with the sliding bar or piston and the longitudinal box containing the volute springs, of the packing-pieces in the top of the slot forming a top to the channel in which the rod or piston slides, and providing a means of attaching the fixed end of the rope or chain to the slot-rails or frame of the cable-way, as and for the purpose set forth.

7. In a cable tramway, the combination, with the slot-rails X X, of the rod or piston A, the longitudinal box B, the packing-pieces C C, the springs D D, &c., the plates D' D', &c., the pulley E, mounted on the axle-pin $e$, carried by the forked end of the rod or piston A, and the wire rope or cord F, all combined, arranged, and operating as and for the purpose set forth.

In witness whereof I have hereunto signed my name in the presence of two subscribing witnesses.

WILLIAM NEWBY COLAM.

Witnesses:
ROBT. ED. PHILLIPS,
EDWARD C. HAMMOND.